United States Patent [19]

Barnes et al.

[11] Patent Number: 5,390,950
[45] Date of Patent: Feb. 21, 1995

[54] METHOD AND ARRANGEMENT FOR FORMING AN AIR BAG DEPLOYMENT OPENING IN AN AUTO INTERIOR TRIM PIECE

[76] Inventors: Kenneth J. Barnes, 50098 Quinton Ct., Site 198A, Shelby Township, Shelby County, Mich. 48315; David J. Bauer, 7356 Meadowridge Cir., West Bloomfield, Mich. 48322

[21] Appl. No.: 27,114
[22] Filed: Mar. 4, 1993
[51] Int. Cl.⁶ .............................................. B60R 21/16
[52] U.S. Cl. .................................. 280/728 B; 280/732
[58] Field of Search ............... 280/728 R, 728 B, 730, 280/731, 732

[56] References Cited

U.S. PATENT DOCUMENTS

| | | | |
|---|---|---|---|
| 4,991,870 | 2/1991 | Beusterien et al. | 280/732 |
| 5,082,310 | 1/1992 | Bauer | 280/728 B |
| 5,181,737 | 1/1993 | Lenzen et al. | 280/732 |
| 5,217,244 | 6/1993 | Bauer | 280/728 B |

FOREIGN PATENT DOCUMENTS

| | | | |
|---|---|---|---|
| 381144 | 8/1990 | European Pat. Off. | 280/728 B |
| 408064 | 1/1991 | European Pat. Off. | 280/728 B |
| 3545028 | 7/1987 | Germany | 280/728 B |
| 197849 | 7/1992 | Japan | 280/728 B |

*Primary Examiner*—Karin L. Tyson
*Attorney, Agent, or Firm*—John R. Benefiel

[57] ABSTRACT

An arrangement and method is described of forming an air bag deployment opening in an interior trim piece having an vinyl skin overlying a rigid substrate so as to be invisible prior to operation of the air bag system, comprising an energy generating linear cutting element arranged in a door pattern beneath the skin acting to degrade or cut the skin when activated. The element is mounted either in an outwardly facing channel formed in door sections of the substrate or on a separate membrane interposed between the skin and substrate.

13 Claims, 4 Drawing Sheets

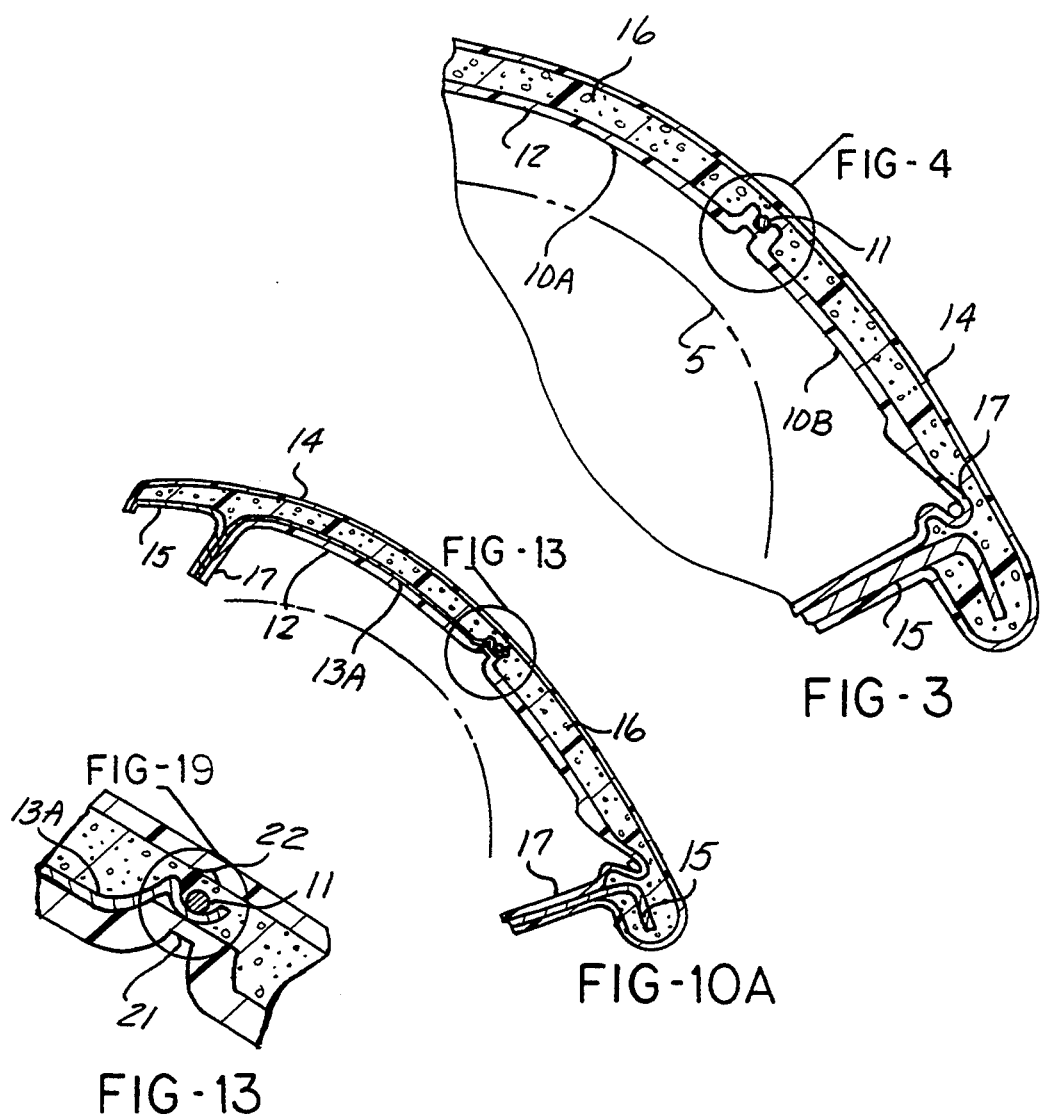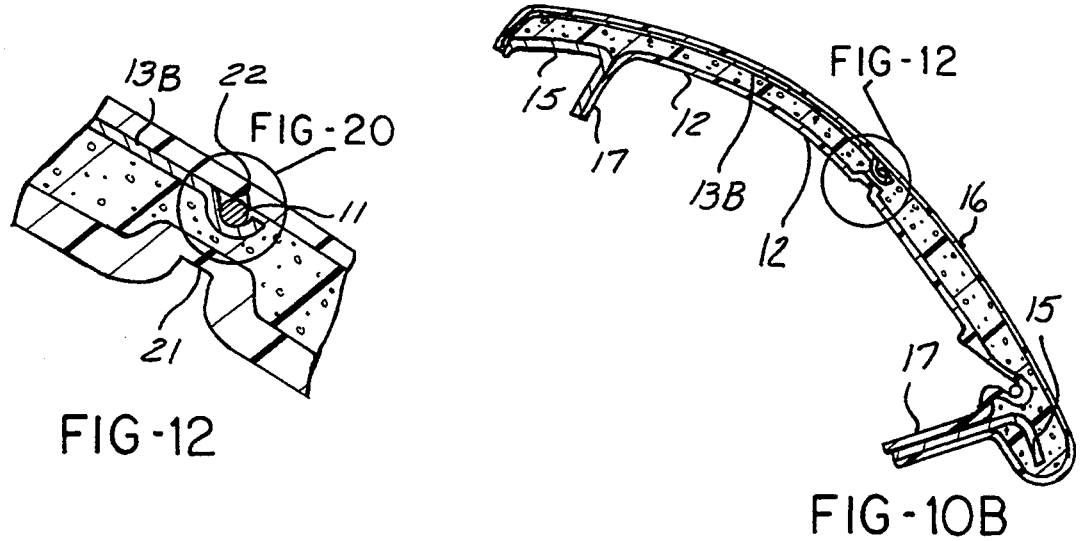

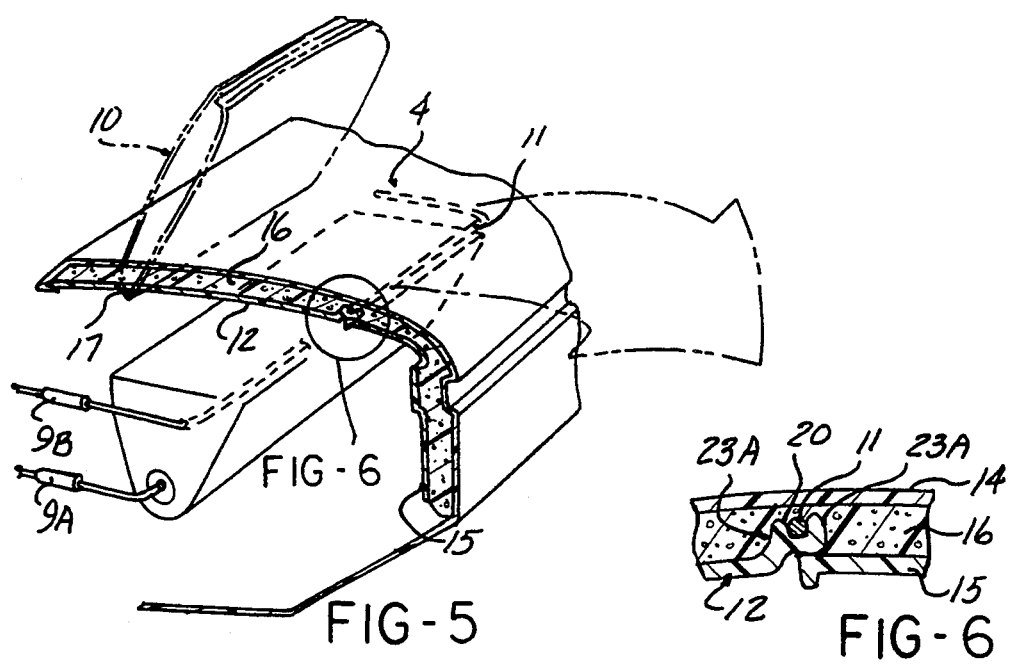
FIG-5
FIG-6
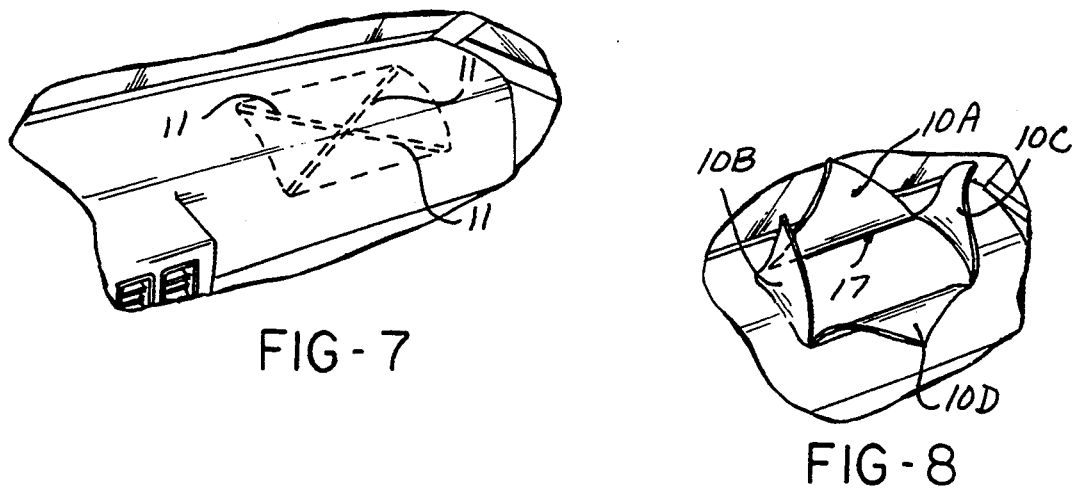
FIG-7
FIG-8
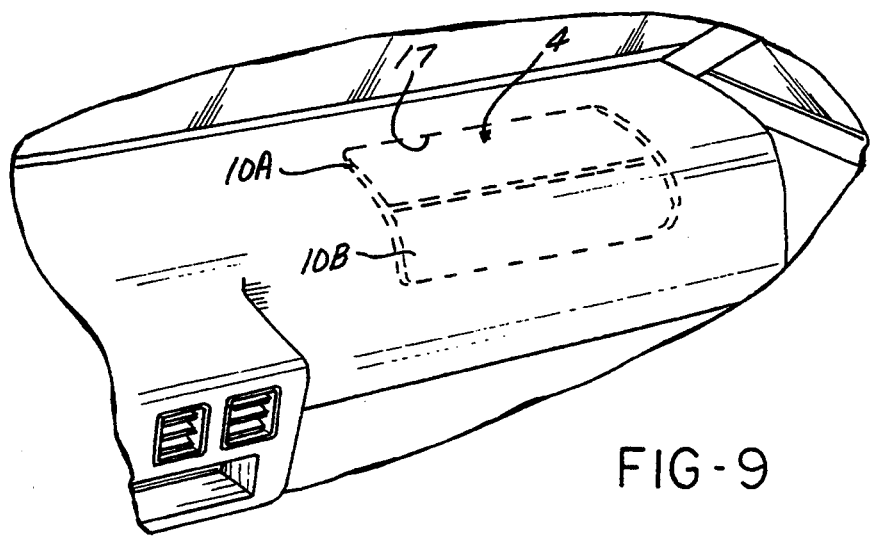
FIG-9

METHOD AND ARRANGEMENT FOR FORMING AN AIR BAG DEPLOYMENT OPENING IN AN AUTO INTERIOR TRIM PIECE

BACKGROUND OF THE INVENTION

This invention concerns so-called "air bag" systems in which an inflatable cushion is stored within a compartment or receptacle in an auto or truck vehicle passenger compartment behind an interior trim piece. When a sensor system detects the onset of a serious crash, the system is triggered, causing gas generators to be activated and the cushion, commonly called "air bag", to be inflated. When inflated, each air bag deploys into a proper position within the passenger compartment to protect the passenger or driver against impact with the interior structure of the vehicle.

The air bag is stored behind an interior trim piece such as the steering wheel cover or a section of the instrument panel, and deploys through an opening provided at the instant of system activation, typically involving a hinged door pushed open by the inflating air bag. U.S. Pat. Nos. 5,083,393 and 4,991,870 describe such installations.

Providing such an opening is a difficult design problem since the air bag must be securely protected against tampering, yet very reliably operable to allow the air bag to deploy within a few milliseconds after the system is activated.

The deployment opening in the associated trim pieces should be invisible so as to not suggest the presence of the stored air bag, as any indication of its presence makes some individuals uneasy, and invites tampering by others. Contrariwise, typical arrangements for providing a deployment opening heretofore employed have delineated or at least suggested the presence of the air bag.

Such arrangements proposed in the past have also often involved extra components and complex assemblies of trim parts such as the instrument panel, increasing costs substantially and reducing reliability.

SUMMARY OF THE INVENTION

The present invention provides an arrangement and method for forming an air bag deployment opening in an auto trim piece, such as the instrument panel, steering wheel, or door trim cover, which does not suggest the presence of the stored bag, nor requires a complex assembly of separate doors, retainers, etc. This arrangement and method comprises the addition of an energy generating linear cutting element to an outwardly facing channel shaped feature formed on the door substrate. Alternatively, the generating the element is mounted on the outer side of a separate membrane that is positioned against the inner surface of the trim piece.

The door substrate or membrane carries the energy generating linear cutting element arranged in a pattern forming one or more doors together forming the deployment opening. When the element is activated, it releases sufficient energy to instantly degrade the outer skin of the trim piece to enable the air bag to push the door or doors open and deploy through the resulting opening. The substrate is formed with one or more doors shaped in correspondence with the element pattern so that the deployment of the air bag is able to force the doors open, once the outer skin has been degraded in the door pattern.

The energy generating linear cutting element is preferably activated by the same command which is associated with the gas generator included in the air bag module, so that the skin degradation occurs at the same instant as the air bag system operation is initiated.

DESCRIPTION OF THE DRAWINGS

FIG. 3 is a view of the sectional take along line 3—3 of the instrument panel passenger side components of a dual invisible seam door shown in FIG. 2 with the mounting of high energy device attached directly to the door section of the substrate.

FIG. 5 is a sectional view of the instrument panel passenger side components of a single hinge invisible seam door with the mounting of high energy device directly attached to the inner door substrate.

FIG. 6 is an enlarged view of the sectional taken along the line 6—6 in FIGS. 2 and 5 of a single hinge invisible seam door with high energy device.

FIG. 7 is a perspective view of a passenger side air bag installation located behind the instrument panel showing the arrangement of a quad inner invisible seam deployment door according to the invention.

FIG. 8 is a perspective view of the quad invisible seam door in the open position.

FIG. 9 is a perspective view of a passenger side air bag installation located behind the instrument panel showing the arrangement of a dual invisible seam deployment door with membrane according to the present invention.

FIG. 10A and 10B are views taken along the line 10A and 10B in FIG. 9 showing alternate variations of dual invisible seam door with a membrane installed in different positions.

FIG. 12 is an enlarged sectional view of the dual invisible seam door with the membrane attached to the inner skin of the instrument panel as shown in FIG. 10A.

FIG. 13 is an enlarged sectional view of a dual invisible seam door with membrane attached to either the instrument panel substrate or door section of the substrate as shown in FIG. 10B.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
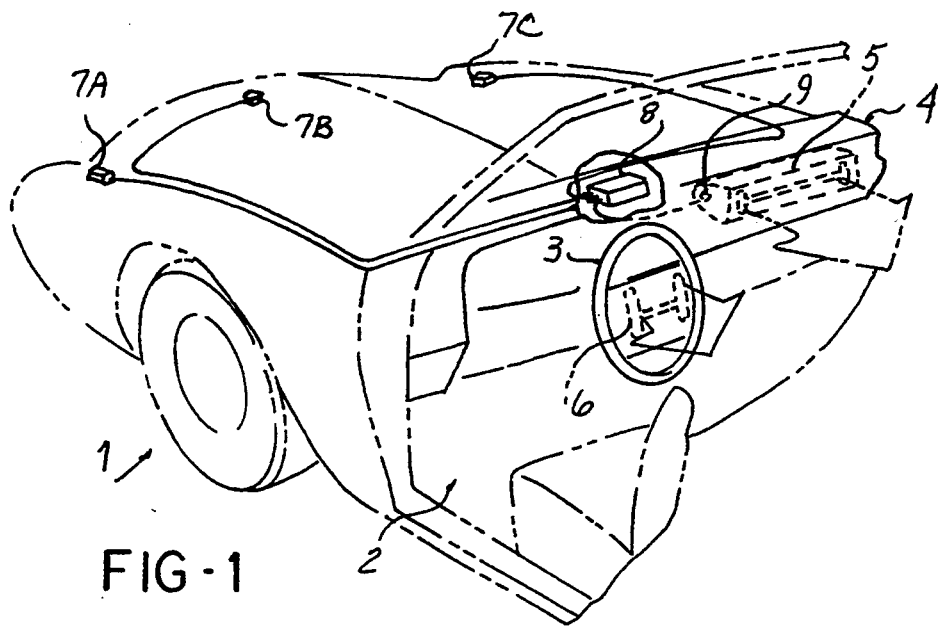
FIG. 1 is a sectioned perspective view of the front of an automobile illustrating an air bag system and components thereof.

Referring to FIG. 1, the forward end of auto vehicle body 1 is shown which defines a passenger compartment 2 within which the driver and front seat passengers are seated.

The current air bag systems provide a folded driver's side air bag stored behind the steering wheel cover 3 and a larger passenger side air bag stored behind a right side section of the instrument panel 4.

The air bag systems are currently designed with each air bag folded and stored in a receptacle 5 (passenger side only shown in FIG. 1) mounted behind an interior trim piece such as the right side section of the instrument panel 4 or the steering wheel cover 6 fit within the steering wheel 3.

A series of crash sensors 7A, 7B and 7C transmit an electronic signal to a diagnostic module 8 on the detection of a collision severe enough to warrant activation of the air bag system.

This module in turn sends an activation signal to an ignitor assembly 9A associated with a gas generator contained within an air bag module in the rectangles used to rapidly produce a large volume of gas to inflate the folded air bag in the recteptacles. Since such air bag systems are well known, and the application of the present invention is not limited to any particular air bag system design, the particulars of these systems is not here set out.

When inflated, the air bag is deployed into the passenger compartment 2 through an opening formed by opening of one or more deployment doors 10A formed by one or more sections of the substrate of the trim piece behind which the air bag receptacle 5 is stored (FIG. 3).

According to the concept of the present invention, the outer skin 14 of the trim piece, illustrated in the Figures by the instrument panel 4, is initially not formed with doors, but rather the doors 10A and 10B, are formed at the moment of initiation of deployment of the air bag system, pushed open by the inflating air bag acting on substrate door sections lying underneath the overlying skin 14, described hereinafter.

This is accomplished by the activation of a separate ignitor 9B in series with an energy generating linear cutting element 11 attached either to the periphery of the deployment door sections of substrate 12 (FIG. 3) or to a separate membrane 13A, 13B (FIGS. 10A and 10B) that contains the energy generating linear cutting element 11. As seen in FIGS. 10A, 10B, 14, and 16–18, the membrane 13A, 13B comprises an additional layer disposed below the skin 14 and extends substantially coextensively with at least one of the door substrate sections. The membrane 13A, 13B has edges located along the free sides of a door substrate section perimeter and another edge extending over the door substrate section flange (FIG. 10A) or over the edge of the instrument panel.

The membrane 13B may be attached directly to the inner surface of a skin 14 (FIG. 10B). Alternatively, a membrane 13A may be mechanically attached to the main section of the instrument panel substrate 15 or foamed in place overlying the door section of the substrate 12.

The activation of the energy linear generating cutting element 11 released sufficient energy to cause at least a partial degradation of the virgin outer skin 14 of the instrument panel section 4 in a door pattern. Alternatively the outer skin inner surface may be preslit, i.e., for vinyl should preferably be no more than 30 percept of its depth to insure sufficient failure of the skin during door deployment.

Figure 16:
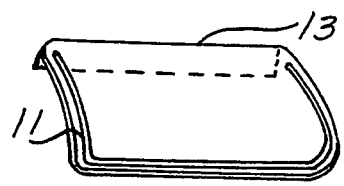
FIGS. 16, 17 and 18 are perspective views of the membrane only with high energy device or coating mounted in "U", "H" or "X" patterns respectively.
Figure 17:
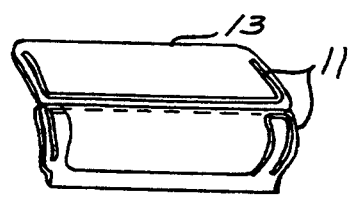
Figure 18:
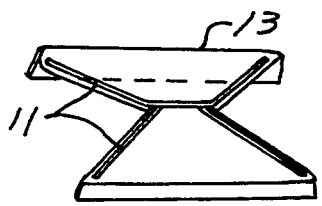
Figure 19:
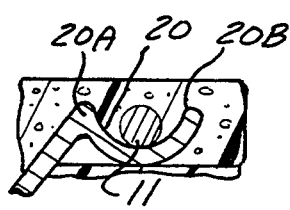
FIGS. 19 and 20 are enlarged views from FIGS. 13 and 14 of the formed channel in the membrane piece that locates the high energy device.
Figure 20:
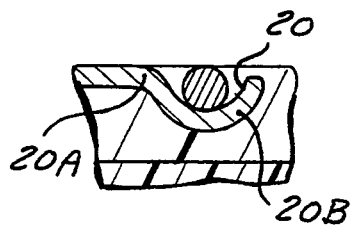

The energy generating linear cutting element 11 is arranged on the door section 12 of substrate or on a separate membrane 13 in a pattern lying just beneath the skin so as to form the free sides of each door forming the deployment opening (FIGS. 2, 5, 8, 9, 11, and 14). One remaining fixed side acts as a hinge allowing the opening movement of the door while keeping the door attached to the adjacent edge of the main substrate section 15 of the instrument panel 4. The number of door patterns is not limited and can have any shape (e.g., "U", "H" and "X") and variations thereof (FIGS. 16, 17 and 18).

At best seen in FIG. 3, the instrument panel 4 is shown constructed of three layers, the outer skin layer 14 (typically of a thin plastic such as vinyl), a central core 16 of a soft foam, and a relatively stiff inner supporting or door substrate layer 12 of a stiff material as of metal or plastic of sufficient thickness which provides backup to the foam core and skin. The foam core 16 may be provided by molding to the substrate 12 or in some limited applications by a foam clad vinyl, in which the skin 12 has a foam layer bonded to it prior to assembly.

Figure 4:
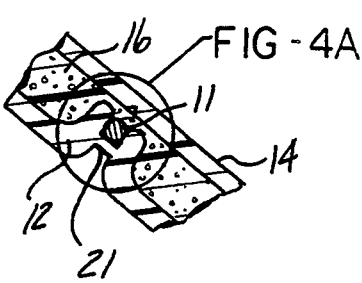
FIG. 4 is an enlarged view of the sectional view shown in FIG. 3 and of the sectional taken along line 4—4 in FIG. 7 a dual invisible seam door with high energy device attached directly to the door section of the substrate.

The door section of the inner substrate 12 is attached along one transverse edge to the main section of the substrate forming the support for the remainder of the instrument panel and three remaining free sides of the doors are configured to the same pattern as the energy generating linear element. The remaining free sides of the door section of the substrate may be completely separate supported with overlapping edges (FIG. 6) or alternatively attached together with the main substrate section with a predetermined breakaway score area or thin frangible tab 21 (FIG. 4).

Figure 2:
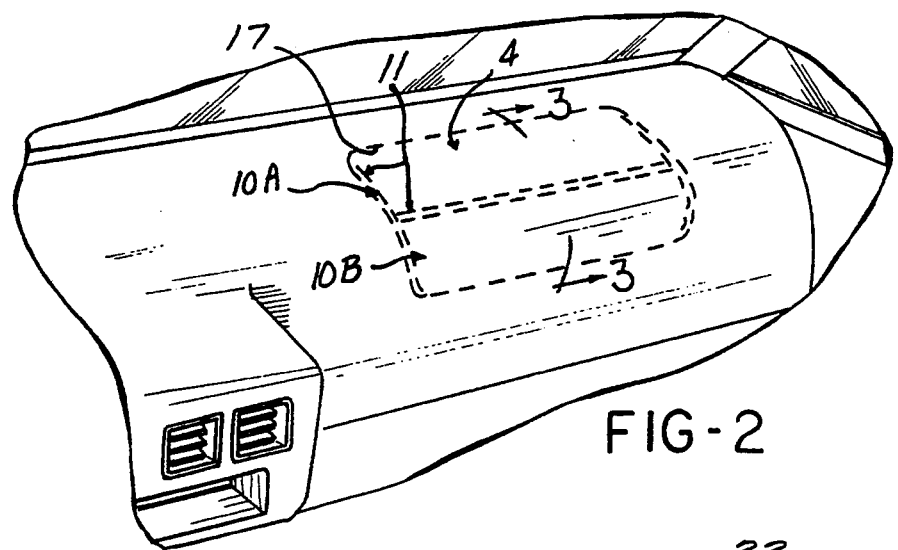
FIG. 2 is a perspective view of a passenger side air bag installation located behind the instrument panel, showing the arrangement of the deployment dual inner invisible seam door according to the present invention of high energy device attached to door substrate.

When two doors are employed, as shown in FIG. 2, a thin frangible tab 21 joins the abutting edges of the respective doors.

Upon the degrading of the outer skin (either virgin or preslit) in the door pattern (FIGS. 2, 5 and 7), the unsevered thickness of the foam core, being soft, is easily sheared by the force of the inflating air bag causing the projecting sharp edge of a channel 20 to stress the foam core and remaining skin and any frangible tabs, to enable the substrate door section 12 to hinge open about its attached edge.

Figure 14:
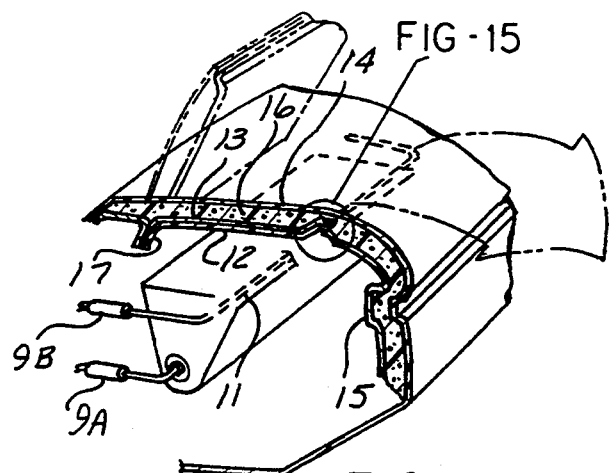
FIG. 14 is a perspective view of the passenger side air bag installation located behind the instrument panel showing the arrangement of a single hinge invisible seam deployment door with a membrane according to the present invention.
Figure 15:
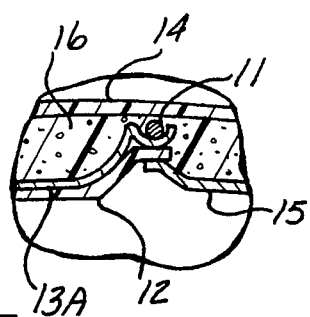
FIG. 15 is an enlarged sectional of the single invisible seam door with membrane attached to door section of the substrate or instrument panel substrate.

The energy generating linear cutting element 11 may comprise a discrete part, such as a length of detonation cord, Pyrofuze (TM) wires or shock tube encased detonation cord, either attached to the periphery of the door sections of the substrate (FIGS. 2, 5 and 7) or to the separate membrane piece 13 (FIGS. 10A, 10B and 14). The linear cutting element 11 can be mounted by adhesives, bonding, molding in place, etc.

An alternative construction comprises coating with a suitable composition comprising energy generating linear cutting element, see U.S. Pat. No. 4,991,870, applied to the membrane piece 13.

Figure 4A:
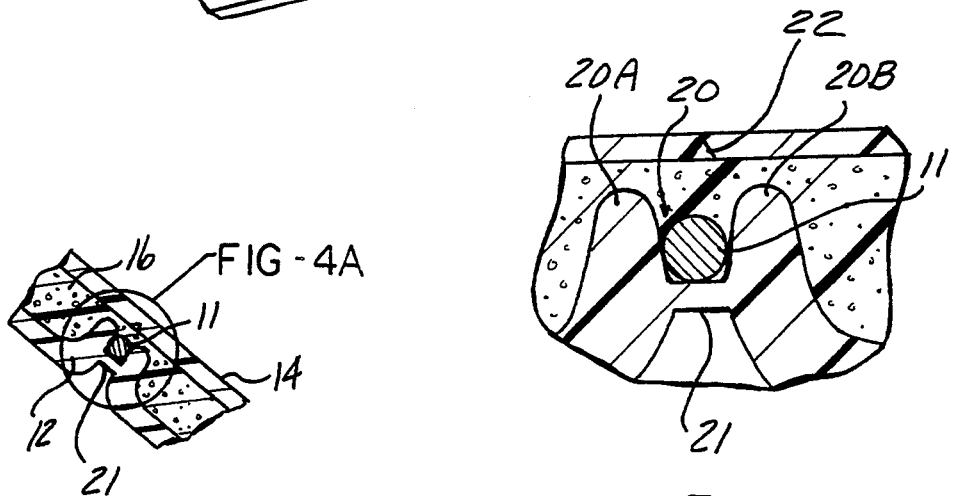
FIG. 4A is an enlarged view of the door channel section shown in FIG. 4 that locates the high energy device.
Figure 11:
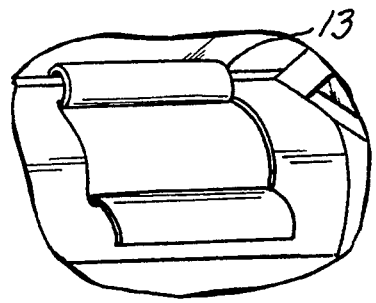
FIG. 11 is a perspective view of the dual door and membrane with doors in the open position.

When the energy generating linear cutting element 11 is attached to the door section 12 of the substrate, the element 11 is received into a channel 20 (FIG. 4A). The channel 20 is formed by spaced projecting lips 23A integral with the side edges of each door section 10A and 10B which project to be located no closer than 5 mm from the inside surface of the outer skin 14 (FIG. 6). Single lips 20A and 20B are formed on the edges of adjacent edges of two doors, spaced apart and connected with frangible tab 21 where the frangible tab design is used (FIGS. 3 and 4). A similar construction is employed where a frangible tab joins the door section of the substrate to the main trim substrate section 15. The channel 20 is outwardly open to direct the generated energy in an outward direction toward the skin 14.

Similarly, the alternative arrangement of the membrane 13 can be attached along one side mechanically with fasteners to either the inner door substrate hinge 17 or to the instrument panel substrate 15 or the membrane 13 can be bonded to the back surface of skin by conventional processes or can be foamed in place either between the foam 16 and skin surface 14 or the foam 16 and door inner substrate 12. The membrane is also formulated with a channel section 20 that is outwardly open to direct the generated energy in an outward direction toward the skin 14.

FIGS. 12, 13, 14, 15, 19, and 20 are views of the membranes 13A, 13B formed with the channel 20. The above described method and arrangement may be employed in any air bag installation (i.e., with steering wheel cover single door or multiple doors, top or midmount location in the instrument panel).

The energy generating linear cutting element 11 is capable (when activated) of releasing energy sufficient to at least degrade or just cut the virgin or preslit skin 14 only, and hence only relatively low energy release is required without significant blast or discharge of particulates into the passenger compartment. At the same time, the difficult task of controlled and reliable rupture of the tough skin 14 at the right moment is insured in a fashion allowing a truly invisible installation.

We claim:

1. An air bag system for a vehicle having a passenger compartment with interior trim pieces lining the interior of said passenger compartment, said air bag system including at least one folded air bag and receptacle stored behind a section of a trim piece lining said interior of said passenger compartment, said trim piece comprised of a rigid substrate, a foam intermediate layer and an overlying decorative skin, an arrangement for forming a deployment opening for said air bag in said trim piece, said arrangement comprising one or more door sections of said substrate each attached along a hinging side to the remaining substrate section, said one or more door sections together forming a deployment opening in the substrate, a channel formed along the remaining sides of said one or more door sections of said substrate extending in a pattern defining the sides of said one or more door sections, said channel open outwardly towards said overlying skin; and a linear energy generating cutting element disposed within said channel and extending along the length thereof; and means for activating said linear energy generating element upon activation of said air bag system.

2. The air bag system according to claim 1 including a pair of adjoining door sections comprising at least a part of said deployment opening are each defined in said substrate and are back formed with an outwardly projecting lip along the adjoining sides thereof, each of said lips spaced apart from the lip of the adjoining door, and wherein said channel is formed by said projecting lips and a bridging frangible tab extending between said lips.

3. The air bag system according to claim 2 wherein said spaced projecting lips are closely spaced below the inside of said overlying skin.

4. The air bag system according to claim 2 wherein said frangible tab is of thin thickness and said linear energy generating element is disposed on said tab.

5. The air bag system according to claim 1 wherein said free sides of said door sections formed in said substrate are separate from the adjoining main substrate sections but overlapping therewith, said channel formed by a pair of lips on the free sides of said one or more doors adjacent said adjoining main substrate section, said channel overlapping said adjoining section to be supported thereon.

6. The air bag system according to claim 1 where said decorative skin comprises a layer of vinyl plastic.

7. An air bag system for a vehicle having a passenger compartment, with the interior trim pieces lining the interior of said passenger compartment, said air bag system including at least one air bag and receptacle stored behind a section of one of said trim pieces, said one of said trim pieces comprised of a rigid substrate, a foam layer overlying said substrate, and a decorative skin overlying said foam layer, an arrangement for forming a deployment opening in said one of said trim pieces enabling deployment of said air bag through said deployment opening upon activation of said air bag system, said arrangement including one or more separate door substrate sections attached to said trim piece substrate, a separate membrane layer mounted in said one of said interior trim pieces interposed between said skin and said one or more door substrate sections, said membrane layer overlying and substantially coextensive with at least one of said one or more door substrate sections, a linear energy generating cutting element arranged in a pattern corresponding to said one or more door sections, affixed to a side of said membrane adjacent the inside of said skin to direct the energy thereof towards said skin; and, means for activating said energy generating linear cutting element upon initiation of said air bag system.

8. The air bag system according to claim 7 wherein said one or more door sections of said substrate of said one of said interior trim pieces is formed with a reduced thickness frangible tab restraining opening of said door section of said substrate.

9. The air bag system according to claim 7 wherein said one or more door sections of said substrate of said one of said trim pieces is formed separate from the adjacent door sections of said substrate.

10. A method of forming an air bag deployment opening in a trim piece of a vehicle having an air bag stored behind said trim piece, said interior trim piece comprised of a rigid substrate and an overlying decorative plastic skin, the method comprising the steps of:

attaching one or more door substrate sections n said trim piece substrate so as to be able to swing open along a side thereof; said skin mounted to overlie said one or more door substrate sections;

arranging a separate membrane layer configured to be substantially coextensive with at least one of said door substrate sections between said substrate and said skin;

mounting an energy generating linear cutting element to said membrane layer on a side facing said skin so as to be arranged in a door pattern substantially matched to said door substrate section and capable of releasing sufficient energy to degrade said overlying skin; and, activating said energy generating linear cutting element at the moment said air bag system is operated to enable a deployment opening to be formed in said skin.

11. The method according to claim 10 including the step of forcing said door section of said substrate to be attached to said adjacent main sections of substrate with a frangible joining tab.

12. The method according to claim 10 wherein said step of mounting said element to said membrane layer includes the step of coating said membrane layer with an energy releasing composition in said door pattern.

13. The method according to claim 10 wherein said step of mounting said element comprises the step of attaching a separate elongate element to said membrane.

* * * * *

UNITED STATES PATENT AND TRADEMARK OFFICE
CERTIFICATE OF CORRECTION

PATENT NO. : 5,390,950
DATED : February 21, 1995
INVENTOR(S) : David J. Bauer et al It is certified that error appears in the above-indentified patent and that said Letters Patent is hereby corrected as shown below:

Title page, item [73] should be inserted to read as follows:

Tip Engineering Group, Inc.
    Farmington Hills, Michigan

The order of the names of the inventors should read as follows:

David J. Bauer
    Kenneth J. Barnes

Signed and Sealed this

Twenty-third Day of May, 1995

Attest:

BRUCE LEHMAN

Attesting Officer      Commissioner of Patents and Trademarks